United States Patent
Hmimy et al.

(10) Patent No.: US 12,352,588 B1
(45) Date of Patent: Jul. 8, 2025

(54) METHODS AND APPARATUS FOR OPTIMIZING DATA OFFLOADING IN ELECTRIC VEHICLES

(71) Applicant: Charter Communications Operating, LLC, St. Louis, MO (US)

(72) Inventors: Hossam Hmimy, Aurora, CO (US); Mohamed Daoud, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 65 days.

(21) Appl. No.: 18/403,971

(22) Filed: Jan. 4, 2024

(51) Int. Cl.
*G01C 21/34* (2006.01)
*H04W 4/44* (2018.01)

(52) U.S. Cl.
CPC ..... *G01C 21/3469* (2013.01); *G01C 21/3492* (2013.01); *H04W 4/44* (2018.02)

(58) Field of Classification Search
CPC ............ G01C 21/3469; G01C 21/3492; G01C 21/3885; G01C 21/3889; G01C 21/3893; G01C 21/3896; H04W 4/40; H04W 4/42; H04W 4/44; H04W 4/46; H04W 4/48
See application file for complete search history.

(56) References Cited

U.S. PATENT DOCUMENTS

| | | | |
|---|---|---|---|
| 10,691,138 B2 | 6/2020 | Antunes Marques Esteves | |
| 11,388,609 B2 | 7/2022 | Khalid et al. | |
| 2022/0126864 A1 | 4/2022 | Moustafa et al. | |
| 2024/0137957 A1* | 4/2024 | Soryal | H04W 12/06 |

* cited by examiner

*Primary Examiner* — Jacob M Amick
(74) *Attorney, Agent, or Firm* — Young Basile Hanlon & MacFarlane, P.C.

(57) ABSTRACT

Methods and systems for optimizing data offloading in electric vehicles are described. A method includes estimating an amount of data that can be collected and generated for a route generated for a destination entered into the electric vehicle, categorizing, by a data offloading device in an electric vehicle, the estimated data into real-time, near real-time, and non-real-time data categories, determining one or more offloading stop and time based on the categorized estimated data and service provider access device information for the route; collecting real data generated by and for the electric vehicle as the electric vehicle traverses the route; categorizing the real data into the real-time, the near real-time, and the non-real-time data categories; and updating the one or more offloading stop and time based on the categorized real data and updated service provider access device information for the route.

20 Claims, 6 Drawing Sheets

METHODS AND APPARATUS FOR OPTIMIZING DATA OFFLOADING IN ELECTRIC VEHICLES

TECHNICAL FIELD

This disclosure relates to electric vehicles. More specifically, this disclosure relates to optimizing data offloading from electric vehicles during travel.

BACKGROUND

Electric vehicles use complex software and applications for autonomous driving, navigation, infotainment, diagnostics, communications, and/or other functional and operational capabilities. These complex software and applications use data generated by the electric vehicle, other electric vehicles, and/or third party service providers to implement the necessary functions and in turn, generate additional data. It is estimated that an electric vehicle uses and/or generates terabytes of data. Consequently, electric vehicles require efficient data management. However, current data management methods lack optimization for data offloading during travel based on network capability awareness, resulting in potential inefficiencies and data congestion.

SUMMARY

Described are methods and systems for optimizing data offloading in electric vehicles.

In an embodiment, a method for optimizing data offloading in an electric vehicle includes estimating, by the electric vehicle, an amount of data that can be collected and generated for a route generated for a destination entered into the electric vehicle, categorizing, by a data categorization and offloading device or data offloading device in the electric vehicle, the estimated data into real-time, near real-time, and non-real-time data categories, determining, by the data categorization and offloading device, one or more offloading stop and time based on the categorized estimated data and service provider access device information for the route, collecting, by the electric vehicle, real data generated by and for the electric vehicle as the electric vehicle traverses the route, categorizing, by a data categorization and offloading device, the real data into the real-time, the near real-time, and the non-real-time data categories, and updating, by the data categorization and offloading device, the one or more offloading stop and time based on the categorized real data and updated service provider access device information for the route.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
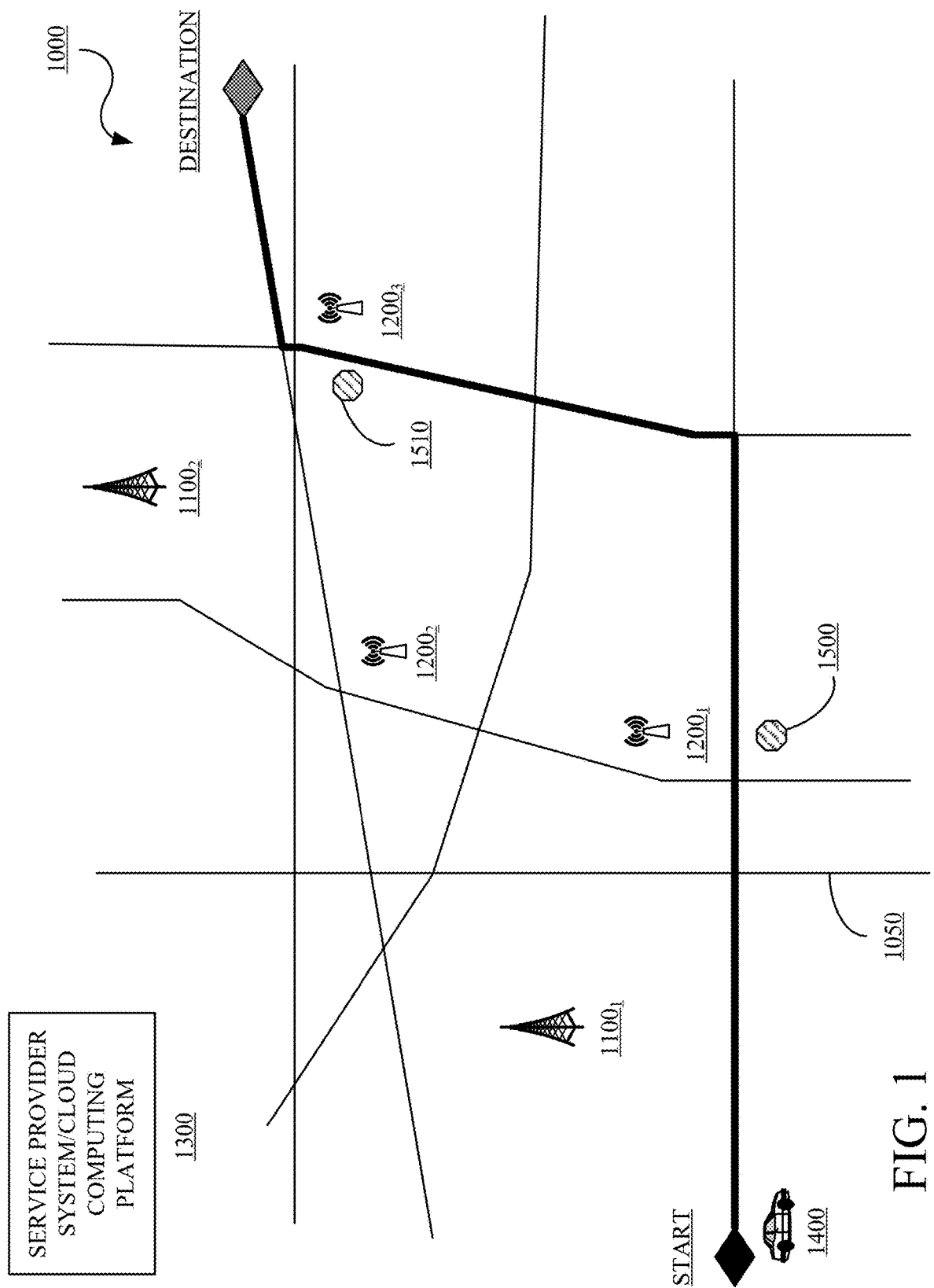
FIG. 1 is a diagram of an example scenario in which a data offloading optimization system may be implemented in accordance with some embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, cloud computing platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU) s, one or more graphics processing units (GPU) s, one or more digital signal processors (DSP) s, one or more application specific integrated circuits (ASIC) s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any computer and/or processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, media players, navigation, entertainment, data management, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein is a method, apparatus, and system for optimized data offloading for an electric vehicle for upcoming and/or during travel. In some implementations, a user may enter a destination address and/or location (collectively "destination") in the electric vehicle. A data offloading optimization controller, device, component, and/or system (collectively "data offloading optimization device") in the electric vehicle may determine an optimized route based on estimating the amount of data transfer to a cloud computing platform for this route and mashing it with information about the network (location, capability, loading, performance etc.) in the area(s) from the service provider (via an API from a service provider real-time (RT) network cloud-based platform). The electric vehicle and/or the data offloading optimization device may manage data categorization, storage, and offloading recommendations. In some implementations, the electric vehicle and/or data offloading optimization device may select the optimal route from a multitude of routes based on mashing the demanded electric vehicle-generated traffic and the network capability-based routes in an optimized way by categorizing data identified into distinct categories, including real-time (RT), near tealtime (nRT) for immediate offloading, and non-real-time (NRT). Data offloading may be implemented using a combination of cellular and WiFi connectivity. The route may be updated during the trip. The route optimization feature enhances data management and contributes to a smoother and more efficient travel experience for the driver and passengers. It ensures that the electric vehicle takes full advantage of available network infrastructure while safeguarding the sensitivity and urgency of offloading data.

In some implementations, the data offloading optimization device may, using the knowledge of the cellular and WiFi resources, make intelligent recommendations for offloading stops at appropriate access points to efficiently manage data transfer, reduce congestion, and minimize costs. The offloading stops can be based on the estimated data and updated based on the actual data. These may be presented to the driver and passengers to set the driver and passengers travel expectations and so that the driver and passengers can plan accordingly.

The categorization and offloading process optimizes data transfer, reduces data congestion, and improves electric vehicle performance. From a cost perspective, prioritization of offloading with service provider WiFi minimizes cellular data usage and associated costs. Moreover, the categorization and offloading process reduces network congestion and enhances overall connectivity by accounting for and using available service provider access points for WiFi offloading.

The system ensures efficient data transfer and improves electric vehicle performance by categorizing data and utilizing a combination of cellular and WiFi connectivity. In addition, the electric vehicle can intelligently select a most optimal route for data offloading based on network capability awareness, amount of data generated, the sensitivity of the data, and the need for offloading. This route optimization process enhances data transfer efficiency and minimizes potential delays in offloading critical data. For instance, nRT data can be processed efficiently and timely.

FIG. 1 is a diagram of an example scenario or environment 1000 in which a data offloading optimization system may be implemented in accordance with some embodiments of this disclosure. The scenario 1000 may include roads 1050, base stations $1100_1$ and $1100_2$, access points $1200_1$, $1200_2$, and $1200_3$ and a service provider system/cloud computing platform 1300 accessible via the base stations $1100_1$ and $1100_2$ and the access points $1200_1$, $1200_2$, and $1200_3$. An electric vehicle 1400 can traverse the roads 1050 from a starting point or location (collectively "start") to a destination. The number of roads, base stations, and access points are illustrative and may vary without departing from the scope of the specification and claims. The scenario 1000 is illustrative and may include additional, fewer, or different components, entities and the like which may be similarly or differently architected without departing from the scope of the specification and claims herein.

The base stations 1100₁ and 1100₂ may provide cellular coverage, including small cell cellular coverage for a defined coverage area. The cellular coverage can be provided using spectrum that is operated, owned, licensed, unlicensed, shared, controlled, and/or combinations thereof by a service provider.

The access points 1200₁, 1200₂, and 1200₃ may provide WiFi coverage. The access points may be owned and/or operated by the service provider.

Figure 2:
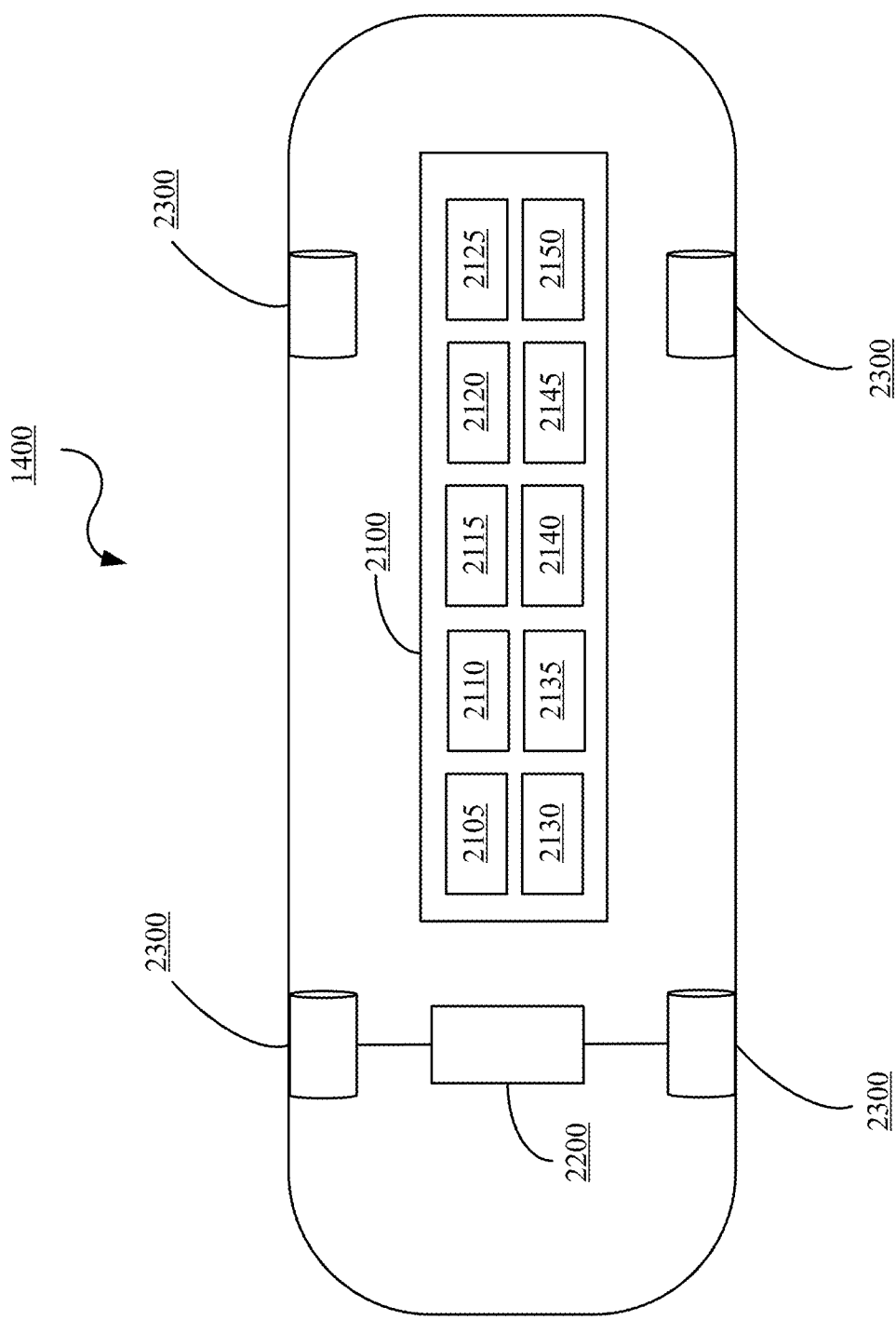
FIG. 2 is a diagram of an example electric vehicle in accordance with some embodiments of this disclosure.

Reference is now made also to FIG. 2, which is a diagram of the example electric vehicle 1400 in accordance with some embodiments of this disclosure. The electric vehicle 1400 may include a vehicle control system or controller 2100 which may control or be programmed to command a drive system 2200 with respect to wheels 2300 of the electric vehicle 1400. In some implementations, the drive system 2200 may include, but is not limited to, a steering system, a braking system, a driving system, and/or a propulsion system. In some implementations, the electric vehicle 1400 can be an autonomous vehicle, including but not limited to, Level 0 (no driving automation), Level 1 (driver assistance), Level 2 (partial driving automation), Level 3 (conditional driving automation), Level 4 (high driving automation), Level 5 (full driving automation), and/or combinations thereof.

The vehicle control system or controller 2100 may include, but is not limited to, a processor 2105, a memory 2110, a communications network 2115, sensors 2120, a user interface 2125, a navigation system 2130, a map database 2135, infotainment systems 2140, a data categorization and offloading device or data offloading device 2145, and an access device database 2150. The vehicle control system or controller 2100 can for example, implement edge computing systems. The vehicle control system or controller 2100 may include additional, fewer, or different components, entities and the like which may be similarly or differently architected without departing from the scope of the specification and claims herein.

The processor 2105 in cooperation with the memory 2110 and other components in the vehicle control system or controller 2100 may be programmed or configured to command or control operational and functional systems of the electric vehicle 1400 such as the drive system 2200.

The memory 2110 may include one or more forms of computer-readable media for storing instructions executable by the processor 2105 for performing various operations as described herein. In some implementations, the memory 2110 may store data received from external sources as described herein and from on-board systems such as the communications network 2115, the sensors 2120, via the user interface 2125, the navigation system 2130, the infotainment systems 2140, and the data categorization and offloading device 2145.

The communications network 2115 may include systems and/or networks for sending and receiving data from the service provider system/cloud computing platform 1300 and other external sources via the base stations 1100₁ and 1100₂ and the access points 1200₁, 1200₂, and 1200₃. The communications network 2115 may include systems and/or networks for sending and receiving data between different on-board systems such as the processor 2105, the memory 2110, the sensors 2120, the user interface 2125, the navigation system 2130, the map database 2135, the infotainment systems 2140, the data categorization and offloading device 2145, and the access device database 2150. The systems and/or networks may include the electric vehicle's internal communication buses, such as a Controller Area Network (CAN) or FlexRay, Ethernet, Local Interconnect Network (LIN), Bluetooth, and/or by any other wired or wireless communications network.

The sensors 2120 may include, but is not limited to, sensors configured to detect an electric vehicle state such as wheel speed, wheel orientation, and engine and transmission variables, and battery status, sensors configured to detect position or orientation such as global positioning system (GPS) sensors, accelerometers, gyroscopes, and inertial measurements units (IMU), and sensors configured to detect an external environment such as radar sensors, rangefinders, light detection and ranging (LIDAR) devices, and image processing sensors such as cameras.

The user interface 2125 may be configured to receive from and/or display to a user or occupant of the electric vehicle 1400. The user interface 2125 may include input mechanisms such as, but is not limited to, touchscreens, buttons, knobs, keypads, cameras, and microphones. The user interface 2125 may include output mechanisms such as, but is not limited to, displays, touchscreens, and speakers.

The navigation system 2130 may be used to determine a route or travel path of the electric vehicle 1400 to go from the start to the destination based input received from the user and/or the occupant. The navigation system 2130 may sue the map database 2135 to determine the route. The navigation device 5090 and the vehicle control system or controller 2100 may collectively determine how and where to steer the electric vehicle 1400 along the roads 1050 based on the route to arrive at the destination.

The map database 2135 may include any type of database for storing map data useful to the vehicle control system or controller 2100. In some embodiments, data in the map database 3060 may be downloaded over a wired or wireless data connection to a network such as the service provider system/cloud computing platform 1300. In some embodiments, data in the map database 3060 may be updated by uploading from the service provider system/cloud computing platform 1300 over the wired or wireless data connection.

The infotainment systems 2140 may present selection options via the user interface 2125, such as entertainment, navigation, and/or traffic that the user and/or the occupant can select and input data. The input data may be used by the vehicle control system or controller 2100 to achieve the selected options of the user and/or the occupant. For example, an address may be entered for the destination. A route may be displayed on the infotainment systems 2140. In some implementations, the user and/or the occupant can modify the route presented via the user interface 2125.

The access devices database 2150 may contain service provider network information including access point and base station locations, access point and base station capabilities, access point and base station cost information (i.e., owned, controlled, licensed, shared, unlicensed, and the like), network load information, latency, traffic, and/or combinations thereof. The access devices database 2150 is updated by the service provider system/cloud computing platform 1300 via available appropriate access devices, such as, base stations and/or access points. The service provider system/cloud computing platform 1300 can include updated and/or real-time information with respect to the service provider networks relevant to the electric vehicle. In some implementations, as described herein below, the access devices database 2150 enables the data categorization and offloading device 2145 to offer alternate optimized or optimal routes, with offloading stops, based on access device availability, capability, and loading. In this instance, as the electric vehicle is enroute, the vehicle control system or controller 2100 can update the route and offloading stops as appropriate to optimize data transmission and reduce data congestion.

The data categorization and offloading device 2145 may categorize data into three categories including RT, nRT, and NRT. The RT data type requires immediate transmission and uses cellular connectivity for instantaneous transfer. The nRT data type is data specific to the trip that requires offloading at the earliest convenience or substantially immediate offloading or transfer. This category prioritizes offloading via WiFi to prevent cellular data usage. The NRT data type can be offloaded when the electric vehicle reaches its home network using WiFi connectivity, i.e., home offloading, or when it is parked at a destination with WiFi coverage. In some implementations, the data categorization and offloading device 2145 may use a categorization model to assist in determining categories for the data.

The data categorization and offloading device 2145 may estimate an amount of data that will be generated based on the route generated by the navigation device 2130 to reach the destination input by the user and/or the occupant using the user interface 2125. In some implementations, the data estimation may be based on historical data stored in the memory 2110. The historical data may include data generation sources, e.g., internal data source(s), external data source(s), and the like. The estimated data may be categorized as described herein.

For instance, the RT data will be sent over cellular communication channels along the route when a base station is available, i.e., when cellular coverage is present. For instance, the NRT data will be buffered for offloading or transferring when the electric vehicle is parked. For instance, the nRT data can be offloaded by scheduling one or more stop(s) (offloading stops), such as offload stops 1500 and 1510 in FIG. 1, along the route proximate to access point or when in the range of WiFi coverage. In some implementations, the offloading stops can be done using base stations due to a lack of access points. The data categorization and offloading device 2145 can determine the offloading stops using the access devices database 2150, data costs, and network load. The user and/or the occupant can also determine estimated wait times at each offloading stop. The offloading stops and times can be presented to the user and/or the occupant. Advantageously, this sets expectations with the user and/or the occupant and the user and/or the occupant can plan accordingly.

The electric vehicle 1400, the vehicle control system or controller 2100, and/or the data categorization and offloading device 2145 can analyze actual generated data for categorization as described herein and mark the data accordingly. The analysis requires the vehicle control system or controller 2100, and/or the data categorization and offloading device 2145 to access, in real-time, other components in the vehicle control system or controller 2100 to access real-time data and to classify the data properly. For instance, the vehicle control system or controller 2100, and/or the data categorization and offloading device may need access to the sensors 2120, the processor 2105, the communication systems 2115, the infotainment systems 2140, the user interface 2125, the navigation system 2130, the map database 2135, and the access device database 2150.

The electric vehicle 1400, the vehicle control system or controller 2100, and/or the data categorization and offloading device 2145 can apply algorithms and rules, as stored for in the memory 2110, to categorize the data into the three specified categories, i.e., RT, nRT, and NRT. For instance, data requiring immediate transmission, such as critical diagnostic information, can be categorized as RT and sent over cellular networks. For instance, trip-specific data that benefits from offloading sooner, like temporary map updates, can be categorized as NRT data. For instance, non-critical data, such as entertainment usage statistics, can be classified as NRT data. In some implementations, the algorithms and rules can account for data size, urgency, and available connectivity options to determine the appropriate category for each data point. The electric vehicle 1400, the vehicle control system or controller 2100, and/or the data categorization and offloading device 2145 can continually update its categorization as new data is generated during the electric vehicle's journey.

The vehicle control system or controller 2100 and/or components therein can transmit the data in accordance with its mark. For instance, RT marked data is transmitted immediately via whichever service is available, i.e., cellular, satellite, WiFi, and/or combinations thereof. For instance, nRT marked data can be stored and/or transmitted based on the location of an access point, distance to the access point, and car speed. The vehicle control system or controller 2100 and/or components therein can estimate the time needed to connect to a nearest access point(s), alert the driver, user and/or the occupant of the location and suggest access point(s) along the roads for a brief stop, indicate how long it will take to offload the nRT data. For instance, NRT marked data can be stored for offloading at the destination.

Figure 3:
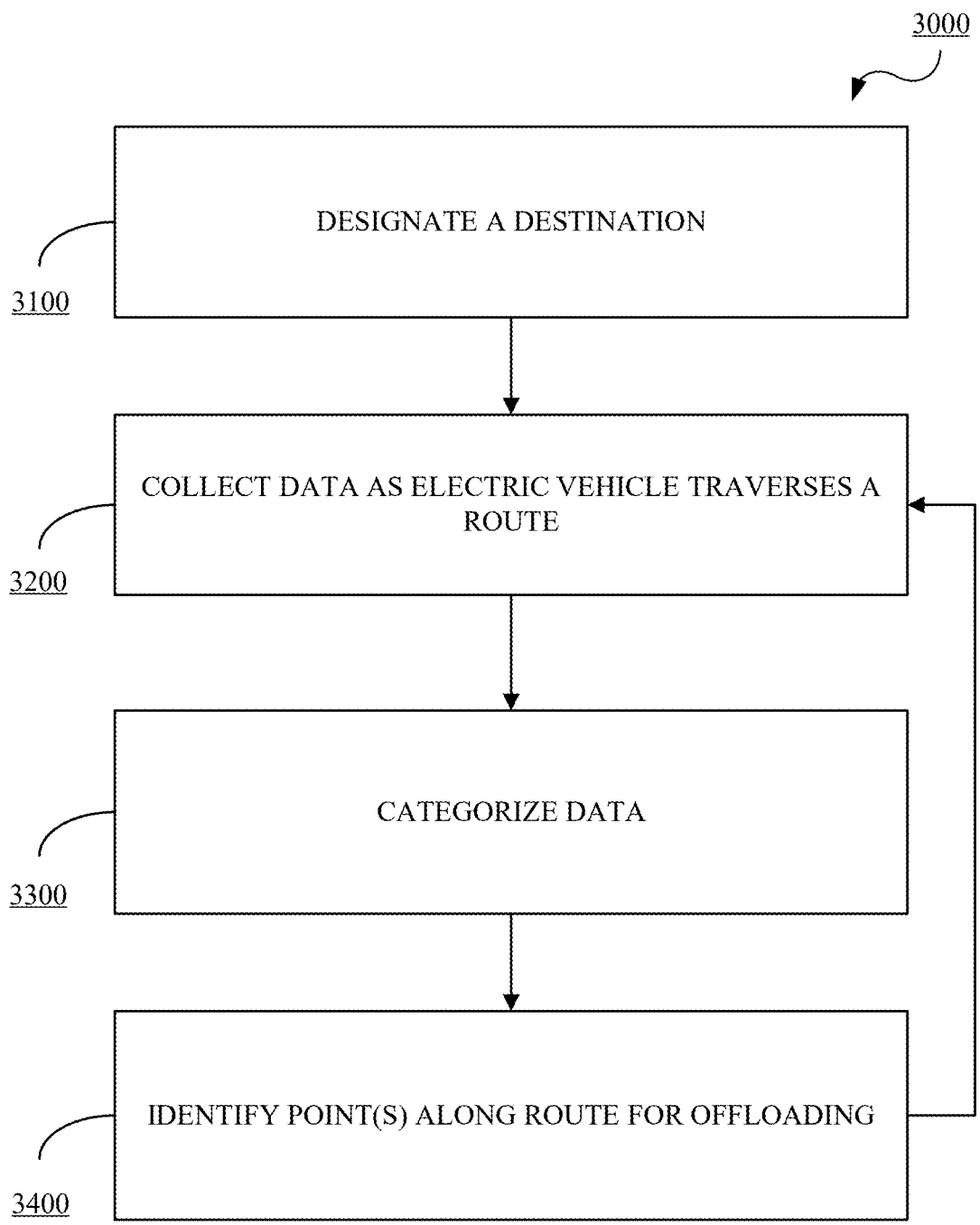
FIG. 3 is a flowchart of an example method for optimized data offloading in accordance with some embodiments of this disclosure.

FIG. 3 is a flowchart of an example method 3000 for optimized data offloading in accordance with some embodiments of this disclosure, which is discussed with reference also to FIGS. 1 and 2. The method 3000 includes designating 3100 a destination, collecting 3200 data as electric vehicle traverses a route, categorizing 3300 the collected data into categories, and identifying 3400 offloading points along the route for offloading the data. The method 3000 can be implemented, for example, in the vehicle 1400, the service provider system/cloud computing platform 1300, the vehicle control system or controller 2100 and/or components therein, and a device 6000 and components therein, as appropriate and applicable.

The method includes designating 3100 a destination. A user and/or an occupant (collectively "user") can enter a destination address, a destination name, and/or combinations thereof ("destination information") by using a user interface in the electric vehicle. A data categorization and offloading device 2145, in cooperation with other components in the electric vehicle, can estimate an amount of data that may be generated as the electric vehicle traverses a route or during the trip, categorize the estimated data as RT, nRT, and NRT, and determine offloading spot(s) or location(s) for portions of data, such as the nRT data. The offloading stop(s) can be based on the route and the access device database and related information. In some implementations, the access device database is updated at this time via access points, base stations, and/or combinations thereof. This can be done via an API call to the service provider system. In some instances, the electric vehicle and/or components therein, including the data categorization and offloading device 2145 can determine that the estimated data can be offloading during the time the electric vehicle is in the offloading spot, i.e., within the coverage area of the access point, base station, and/or other access device. In some instances, depending on the amount of estimated data, the offloading spot(s) may also have an offloading or wait time. The offloading spot(s) and appropriate offloading time(s) may be presented to the user for user planning, knowledge, and/or setting user expectations.

The method includes collecting 3200 data as electric vehicle traverses a route. The electric vehicle generates, collects, and stores data (actual data) as the user and/or electric vehicle collectively navigate to the destination. Various types of data can be collected from one or more on-board sensors and systems, one or more external sources, and/or combinations thereof.

The method includes categorizing 3300 the collected data into categories. The electric vehicle and/or components therein, including the data categorization and offloading device 2145, can categorize the collected data as RT, nRT, and NRT.

The method includes identifying 3400 offloading points along the route for offloading a portion of the data. The electric vehicle and/or components therein, including the data categorization and offloading device 2145 can determine offloading spot(s) for portions of the collected data (i.e., actual or real data), such as the nRT data. The offloading stop(s) can be based on the route and updates thereto and the access device database and related information and updates thereto. In some instances, the electric vehicle can determine that the collected data can be offloading during the time the electric vehicle is in the offloading spot, i.e., within the coverage area of the access point, base station, and/or other access device. In some instances, the electric vehicle can determine that a brief stop is needed to offload the collected data. In these instances, an offloading time can be calculated for the appropriate offloading stop(s). In some implementations, the offloading points generated from the actual data can update the offloading points generated from the estimated data. The offloading spot(s) and offloading time(s), if needed, may be presented to the user for user planning, knowledge, and/or setting user expectations. The method 3000 can iterate through data collection, data categorization, and offloading spot identification and update as appropriate as the electric vehicle traverses along the route. The electric vehicle and/or components therein command and/or control the operational systems of the electric vehicle to traverse the route, as appropriate and applicable.

Figure 4:
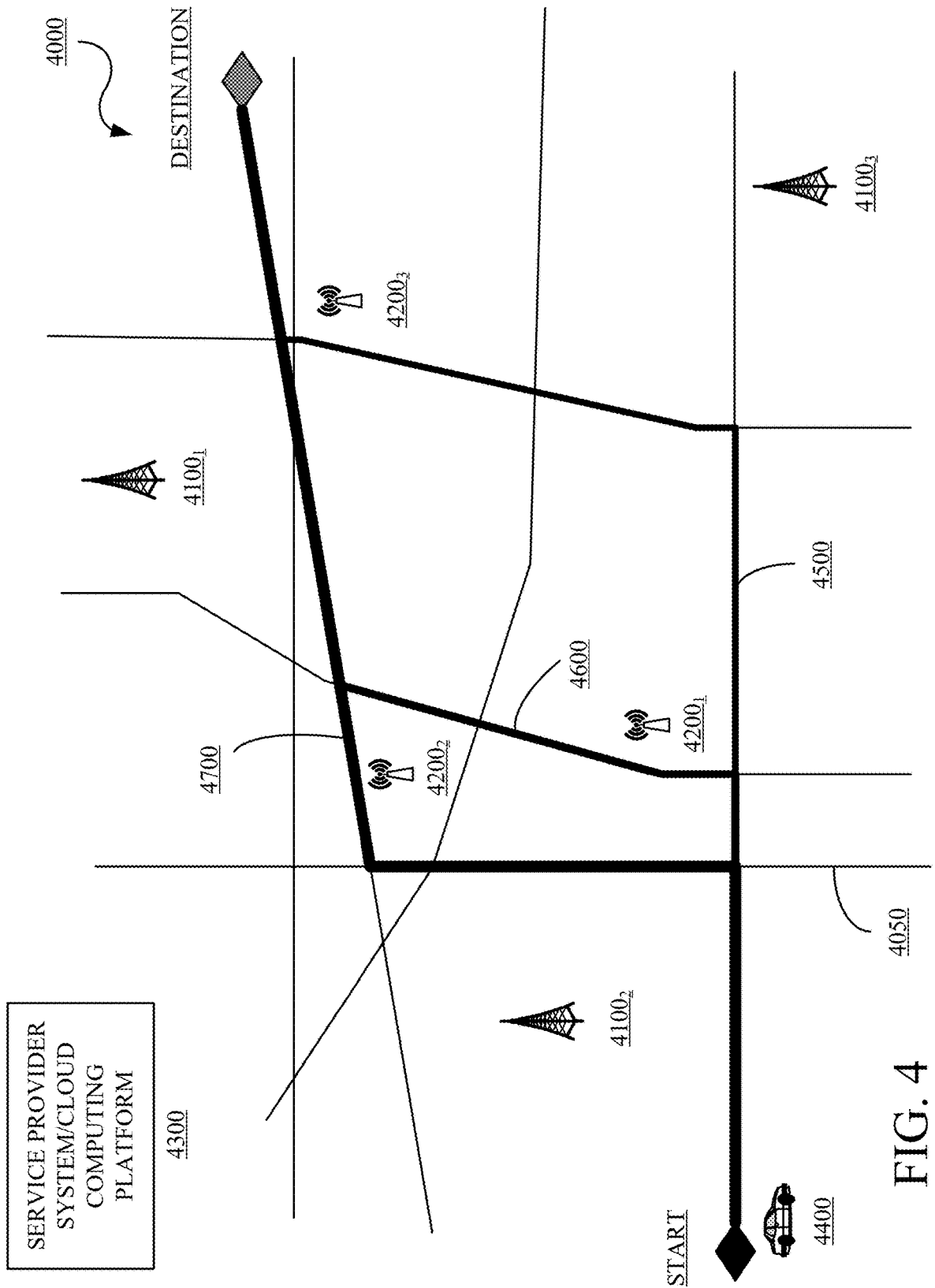
FIG. 4 is a diagram of another example scenario in which a data offloading optimization system may be implemented in accordance with some embodiments of this disclosure.

FIG. 4 is a diagram of an example scenario or environment 4000 in which a data offloading optimization system may be implemented in accordance with some embodiments of this disclosure. The scenario may include roads 4050, base stations 4100$_1$, 4100$_2$ and 4100$_3$, access points 4200$_1$, 4200$_2$, and 4200$_3$ and a service provider system/cloud computing platform 4300 accessible via the base stations 4100$_1$, 4100$_2$ and 4100$_3$ and the access points 4200$_1$, 4200$_2$, and 4200$_3$. An electric vehicle 4400 can traverse the roads 4050 from a starting point or location (collectively "start") to a destination. The description with respect to FIGS. 1-3 are relevant and appropriate to FIG. 4 and are not repeated here. The number of roads, base stations, and access points are illustrative and may vary without departing from the scope of the specification and claims. The scenario 4000 is illustrative and may include additional, fewer, or different components, entities and the like which may be similarly or differently architected without departing from the scope of the specification and claims herein.

Figure 5:
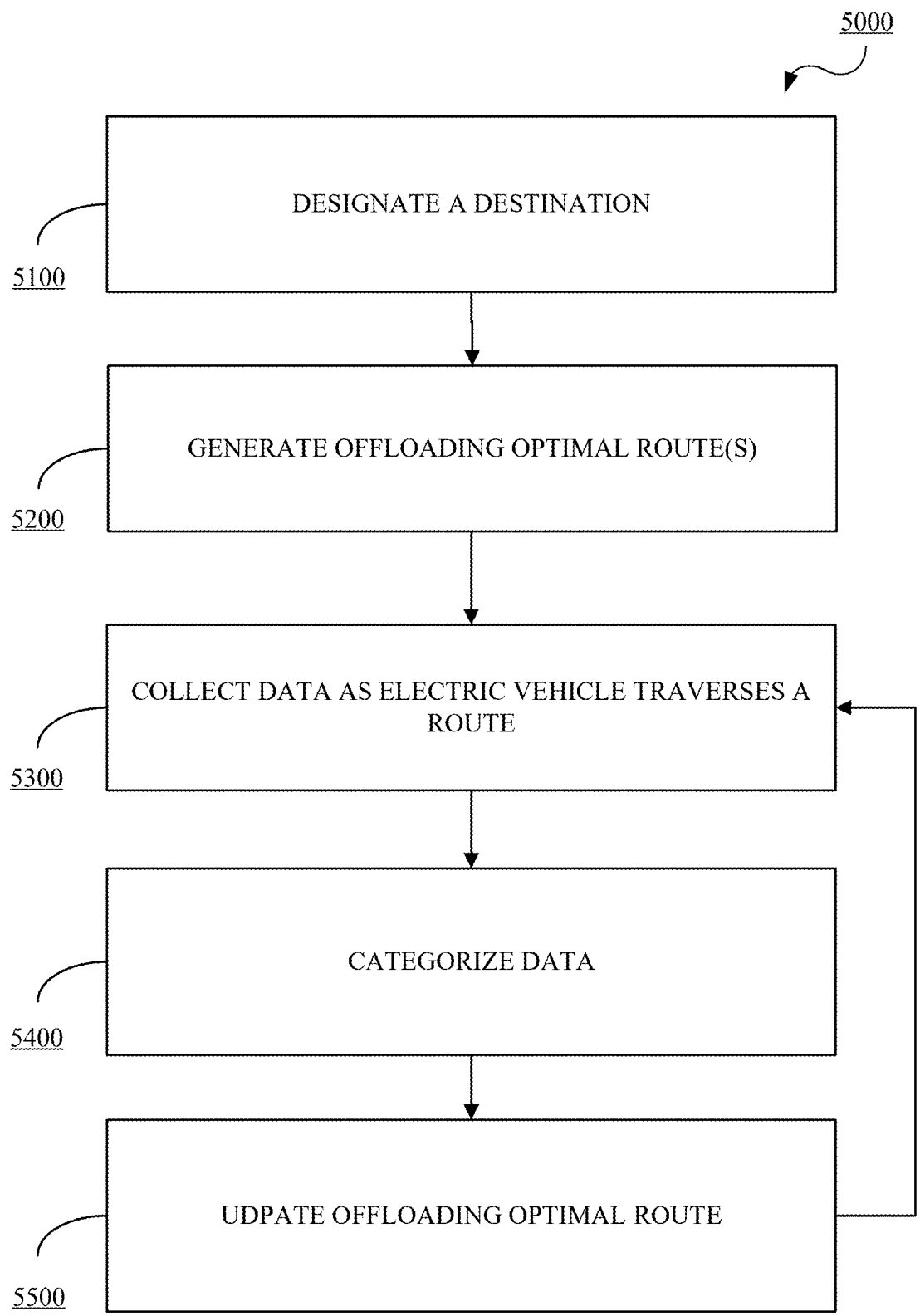
FIG. 5 is a flowchart of an example method for optimized data offloading in accordance with some embodiments of this disclosure.

FIG. 5 is a flowchart of an example method 5000 for optimized data offloading in accordance with some embodiments of this disclosure, which is discussed with reference also to FIGS. 1-4, as appropriate and applicable. The method 5000 includes designating 5100 a destination, generating 5200 one or more offloading optimal routes based on estimated data, collecting 5300 data as electric vehicle traverses an offloading optimal route, categorizing 5400 the collected data into categories, and updating 5500 the offloading optimal route based on the categorized collected data. The method 5000 can be implemented, for example, in the vehicle 1400, the service provider system/cloud computing platform 1300, the vehicle control system or controller 2100 and/or components therein, the vehicle 4400, the service provider system/cloud computing platform 4300, and a device 6000 and components therein, as appropriate and applicable.

The method includes designating 5100 a destination. A user and/or an occupant (collectively "user") can enter a destination address, a destination name, and/or combinations thereof ("destination information") by using a user interface in the electric vehicle. A data categorization and offloading device 2145, in cooperation with other components in the electric vehicle, can estimate an amount of data that may be generated. The estimated amount of data to be generated during the trip or journey may be based on various factors, including route length, expected usage of in-vehicle systems, and user preferences. The estimated data can be categorized as RT, nRT, and NRT.

The method includes generating 5200 one or more offloading optimal routes based on estimated data. The data categorization and offloading device 2145, in cooperation with other components in the electric vehicle, can determine, identify, and/or classify the estimated data with respect to data sensitivity. This can refer to diagnostics data, privacy, or security. The data categorization and offloading device 2145 can assess the sensitivity of data points based on predefined criteria and user settings. In some implementations, the access device database is updated at this time via access points, base stations, and/or combinations thereof. This can be done via an API call to the service provider system. The data categorization and offloading device 2145, in cooperation with other components in the electric vehicle, can employ algorithms that weigh the estimated data volume, data sensitivity, and the capabilities of available access points and/or base stations including the service provider rights and costs with respect to each of the available access points and/or base stations, traffic, load, congestion, data prioritization, and other capabilities and aspects, to determine one or more offloading optimal route(s). In some implementations, the one or more offloading optimal route(s) is based on the nRT data or amount of nRT data. The data categorization and offloading device 2145 can determine or generate potential routes that match or exceed the network capabilities. In some implementations, the one or more offloading optimal route(s) can include offloading spot(s) or location(s) for portions of data as described with respect to FIG. 3 and not repeated here for sake of brevity. The electric vehicle 4400 can present or display the one or more offloading optimal route(s), such as one or more offloading optimal route(s) 4500, 4600, and 4700, to the user. These recommendations prioritize routes that align with the data offloading requirements, ensuring that data is efficiently transferred while minimizing potential delays. In some implementations, the user can select the route. In some implementations, the electric vehicle 4400 can identify one route as a default route and select the default route in the event the user makes no route selection.

The method includes collecting 5300 data as electric vehicle traverses a offloading optimal route. The electric vehicle generates, collects, and stores data (actual data) as the user and/or electric vehicle collectively navigate to the destination. Various types of data can be collected from one or more on-board sensors and systems, one or more external sources, and/or combinations thereof.

The method includes categorizing 5400 the collected data into categories. The electric vehicle and/or components therein, including the data categorization and offloading device 2145, can categorize the collected data as RT, nRT, and NRT.

The method includes updating 5500 the offloading optimal route based on the categorized collected data. The electric vehicle and/or components therein, including the data categorization and offloading device 2145 can dynamically and in real-time update the offloading optimal route, including updated offloading stops, based on the categorized collected data including, for example, changing network conditions, environmental factors such as weather, detours, vehicle traffic, and/or other considerations. This can maintain efficient data offloading. The electric vehicle and/or components therein command and/or control the operational systems of the electric vehicle to traverse the route, as appropriate and applicable.

Figure 6:
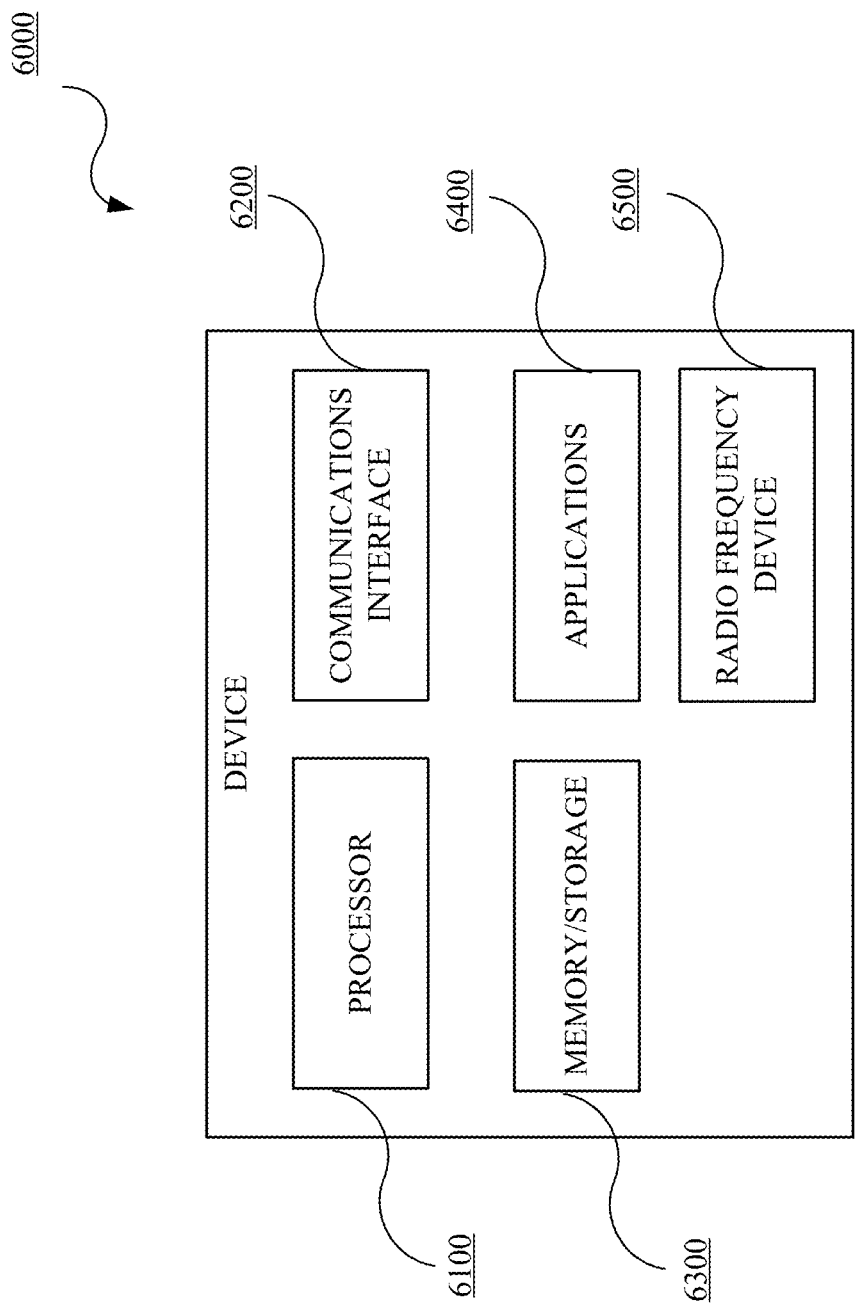
FIG. 6 is a block diagram of an example device in accordance with some embodiments of this disclosure.

FIG. 6 is a block diagram of an example device 6000 in accordance with some embodiments of this disclosure. The device 6000 may include, but is not limited to, a processor 6100, a memory/storage 6200, a communication interface 6300, applications 6400, and/or a RF device 6500. The device 6000 may include or implement, for example, the electric vehicle 1400 and components therein, the base stations 1100$_1$, 1100$_2$, 4100$_1$, 4100$_2$ and 4100$_3$, the access points 1200$_1$, 1200$_2$, 1200$_3$, 4200$_1$, 4200$_2$, and 4200$_3$, and the electric vehicle 4400 and components therein. In implementations, the memory/storage 6200 may store the data, historical data, the generated data, and the databases used herein. The techniques or methods described herein may be stored in the memory/storage 6200 and executed by the processor 6100 in cooperation with the memory/storage 6200, the communications interface 6300, and applications 6400, as appropriate. The device 6000 may include other elements which may be desirable or necessary to implement the devices, systems, methods described herein. However, because such elements and steps are well known in the art, and because they do not facilitate a better understanding of the disclosed embodiments, a discussion of such elements and steps may not be provided herein.

Described herein are methods, devices, and systems for optimizing data offloading in an electric vehicle. In some embodiments, a method includes estimating, by the electric vehicle, an amount of data that can be collected and generated for a route generated for a destination entered into the electric vehicle, categorizing, by a data categorization and offloading device in the electric vehicle, the estimated data into real-time, near real-time, and non-real-time data categories, determining, by the data categorization and offloading device, one or more offloading stop and time based on the categorized estimated data and service provider access device information for the route, collecting, by the electric vehicle, real data generated by and for the electric vehicle as the electric vehicle traverses the route, categorizing, by a data categorization and offloading device, the real data into the real-time, the near real-time, and the non-real-time data categories, and updating, by the data categorization and offloading device, the one or more offloading stop and time based on the categorized real data and updated service provider access device information for the route.

In some embodiments, the one or more offloading stop and time and the updated one or more offloading stop and time are directed to offloading of near real-time data which requires substantially immediate offloading. In some embodiments, the one or more offloading stop and time and the updated one or more offloading stop and time are selected based on usage of service provider access points in the service provider access device information. In some embodiments, the service provider access device information includes service provider access point locations, base station locations, access point capabilities, base station capabilities, access point cost information, base station cost information, and load, latency, and traffic information for each service provider access point and base station. In some embodiments, the one or more offloading stop and time and the updated one or more offloading stop and time are selected based on usage of a combination of base stations and service provider access points in the service provider access device information. In some embodiments, the method further includes alerting, by the electric vehicle, a user in the electric vehicle of the one or more offloading stop and time and the updated one or more offloading stop and time. In some embodiments, the one or more offloading stop and time and the updated one or more offloading stop and time is an offloading stop for a non-zero amount of time. In some embodiments, the method further includes determining, by the data categorization and offloading device, one or more offloading optimal routes based on the destination, the categorized estimated data, and the service provider access device information. In some embodiments, the method further includes using, by the electric vehicle, a user selected offloading optimal route from the one or more offloading optimal routes or a default offloading optimal route from the one or more offloading optimal routes for reaching the destination. In some embodiments, the method further includes updating, by the electric vehicle, the user selected offloading optimal route or the default offloading optimal route based on the categorized real data and updated service provider access device information.

In some embodiments, an electric vehicle data offloading optimization system includes a memory configured to store a categorization model, a service provider access device database including base stations and service provider access points, and a processor connected to the service provider access device database and the memory, the processor and the memory implementing the categorization model. The processor configured to generate a data estimate for travel to a destination entered into the electric vehicle, determine an amount of near real-time data for offloading from the data estimate, determine one or more optimal routes based on the destination, the amount of near real-time data, and service provider access device information which optimize offloading of the near real-time data using service provider access points, employ a user selected or default optimal route from the one or more optimal routes to reach the destination, and update the user selected or default optimal route based on actual near real-time data from traversing the user selected or default optimal route and updated service provider access device information.

In some embodiments, each of the one or more optimal route includes one or more offloading stop based on the amount of near real-time data. In some embodiments, the updated user selected or default optimal route includes updated one or more offloading stop. In some embodiments, the processor further configured to categorize the actual data generated by and for the electric vehicle as the electric vehicle traverses the user selected or default optimal route, wherein categorization includes real-time, near real-time, and non-real-time data categories. In some embodiments, the service provider access device information includes service provider access point locations, base station locations, access point capabilities, base station capabilities, access point cost information, base station cost information, and load, latency, and traffic information for each service provider access point and base station. In some embodiments, the one or more optimal routes are determined based on usage of a combination of base stations and the service provider access points from the service provider access device information.

In some embodiments, a method for optimizing data offloading in an electric vehicle includes estimating, by the electric vehicle, an amount of data that can be collected and generated to reach a destination entered into the electric vehicle, categorizing, by a data categorization device in the electric vehicle, the estimated data into real-time, near real-time, and non-real-time data categories, determining, by the data categorization and offloading device, one or more offloading optimal route based on the categorized estimated data and service provider access device information, traveling, by the electric vehicle, toward the destination using one of the one or more offloading optimal route, categorizing, by a data categorization and offloading device in the electric vehicle, actual data collected while traveling into the real-time, the near real-time, and the non-real-time data categories, updating, by the electric vehicle, the one of the one or more offloading optimal route based on the categorized actual data and updated service provider access device information.

In some embodiments, each of the one or more optimal route includes one or more offloading stop based on the estimated data of near real-time data. In some embodiments, the updated one of the one or more optimal route includes updated one or more offloading stop based on an amount of data in the near real-time category. In some embodiments, the one or more optimal route is based on usage of service provider access points in the service provider access device information.

In some embodiments, a method for optimizing data offloading in an electric vehicle includes estimating, by the electric vehicle, an amount of data that can be collected and generated for a route in response to a destination entered into the electric vehicle, categorizing, by a data offloading device in the electric vehicle, the estimated data into real-time, near real-time, and non-real-time data categories, determining, by the data offloading device, one or more offloading stop based on the categorized estimated data and service provider access device information for the route, collecting, by the electric vehicle, real data generated by and for the electric vehicle as the electric vehicle traverses the route, categorizing, by the data offloading device, the real data into the real-time, the near real-time, and the non-real-time data categories, and updating, by the data offloading device, the one or more offloading stop based on updated service provider access device information for the route and the categorized real data.

In some embodiments, the one or more offloading stop and the updated one or more offloading stop are directed to offloading of near real-time data which requires substantially immediate offloading. In some embodiments, the one or more offloading stop and the updated one or more offloading stop are selected based on usage of service provider access points in the service provider access device information. In some embodiments, the service provider access device information includes service provider access point locations, base station locations, access point capabilities, base station capabilities, access point cost information, base station cost information, and load, latency, and traffic information for each service provider access point and base station. In some embodiments, the one or more offloading stop and the updated one or more offloading stop are selected based on usage of a combination of base stations and service provider access points in the service provider access device information. In some embodiments, the method further includes alerting, by the electric vehicle, a user in the electric vehicle of the one or more offloading stop and the updated one or more offloading stop, wherein the one or more offloading stop includes an amount of time needed to offload at least the near real-time data. In some embodiments, the one or more offloading stop and the updated one or more offloading stop is an offloading stop for a non-zero amount of time. In some embodiments, the method further includes determining, by the data offloading device, one or more offloading optimal routes based on the destination, the categorized estimated data, and the service provider access device information. In some embodiments, the method further includes using, by the electric vehicle, a user selected offloading optimal route from the one or more offloading optimal routes or a default offloading optimal route from the one or more offloading optimal routes for reaching the destination. In some embodiments, the method further includes updating, by the electric vehicle, the user selected offloading optimal route or the default offloading optimal route based on the categorized real data and the updated service provider access device information.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for optimizing data offloading in an electric vehicle, the method comprising:
   estimating, by the electric vehicle, an amount of data that can be collected and generated for a route in response to a destination entered into the electric vehicle;
   categorizing, by a data offloading device in the electric vehicle, the estimated data into real-time, near real-time, and non-real-time data categories;
   determining, by the data offloading device, one or more offloading stop based on the categorized estimated data and service provider access device information for the route;
   collecting, by the electric vehicle, real data generated by and for the electric vehicle as the electric vehicle traverses the route;
   categorizing, by the data offloading device, the real data into the real-time, the near real-time, and the non-real-time data categories; and
   updating, by the data offloading device, the one or more offloading stop based on updated service provider access device information for the route and the categorized real data.

2. The method of claim 1, wherein the one or more offloading stop and the updated one or more offloading stop are directed to offloading of near real-time data which requires substantially immediate offloading.

3. The method of claim 1, wherein the one or more offloading stop and the updated one or more offloading stop are selected based on usage of service provider access points in the service provider access device information.

4. The method of claim 3, wherein the service provider access device information includes service provider access point locations, base station locations, access point capabilities, base station capabilities, access point cost information, base station cost information, and load, latency, and traffic information for each service provider access point and base station.

5. The method of claim 1, wherein the one or more offloading stop and the updated one or more offloading stop are selected based on usage of a combination of base stations and service provider access points in the service provider access device information.

6. The method of claim 1, further comprising:
   alerting, by the electric vehicle, a user in the electric vehicle of the one or more offloading stop and the updated one or more offloading stop, wherein the one or more offloading stop includes an amount of time needed to offload at least the near real-time data.

7. The method of claim 1, wherein the one or more offloading stop and the updated one or more offloading stop is an offloading stop for a non-zero amount of time.

8. The method of claim 1, further comprising:
determining, by the data offloading device, one or more offloading optimal routes based on the destination, the categorized estimated data, and the service provider access device information.

9. The method of claim 8, further comprising:
using, by the electric vehicle, a user selected offloading optimal route from the one or more offloading optimal routes or a default offloading optimal route from the one or more offloading optimal routes for reaching the destination.

10. The method of claim 9, further comprising:
updating, by the electric vehicle, the user selected offloading optimal route or the default offloading optimal route based on the categorized real data and the updated service provider access device information.

11. An electric vehicle data offloading optimization system comprising:
a memory configured to store a categorization model;
a service provider access device database including base stations and service provider access points; and
a processor connected to the service provider access device database and the memory, the processor and the memory implementing the categorization model, the processor configured to:
generate a data estimate for travel to a destination entered into the electric vehicle;
determine an amount of near real-time data in a near-real time category for offloading from the data estimate;
determine one or more optimal routes based on the destination, the amount of near real-time data, and service provider access device information which optimize offloading of the near real-time data using service provider access points;
employ a user selected or default optimal route from the one or more optimal routes to reach the destination; and
update the user selected or default optimal route based on actual near real-time data from traversing the user selected or default optimal route and updated service provider access device information.

12. The system of claim 11, wherein each of the one or more optimal route includes one or more offloading stop based on the amount of near real-time data.

13. The system of claim 12, wherein the updated user selected or default optimal route includes updated one or more offloading stop, wherein the one or more offloading stop includes an amount of time needed to offload at least the near real-time data.

14. The system of claim 11, the processor further configured to:
categorize the actual data generated by and for the electric vehicle as the electric vehicle traverses the user selected or default optimal route, wherein categorization includes a real-time category, the near real-time category, and a non-real-time data category.

15. The system of claim 11, wherein the service provider access device information includes service provider access point locations, base station locations, access point capabilities, base station capabilities, access point cost information, base station cost information, and load, latency, and traffic information for each service provider access point and base station.

16. The system of claim 11, wherein the one or more optimal routes are determined based on usage of a combination of base stations and the service provider access points from the service provider access device information.

17. A method for optimizing data offloading in an electric vehicle, the method comprising:
estimating, by the electric vehicle, an amount of data that can be collected and generated to reach a destination entered into the electric vehicle;
categorizing, by a data offloading device in the electric vehicle, the estimated data into real-time, near real-time, and non-real-time data categories;
determining, by the data offloading device, one or more offloading optimal route based on the categorized estimated data and service provider access device information;
traveling, by the electric vehicle, toward the destination using one of the one or more offloading optimal route;
categorizing, by a data offloading device in the electric vehicle, actual data collected while traveling into the real-time, the near real-time, and the non-real-time data categories; and
updating, by the electric vehicle, the one of the one or more offloading optimal route based on updated service provider access device information and the categorized actual data.

18. The method of claim 17, wherein each of the one or more optimal route includes one or more offloading stop based on the estimated data of near real-time data.

19. The method of claim 18, wherein the updated one of the one or more optimal route includes updated one or more offloading stop based on an amount of data in a near real-time category.

20. The method of claim 17, wherein the one or more optimal route is based on usage of service provider access points in the service provider access device information.

* * * * *